United States Patent [19]

Kativois

[11] Patent Number: 4,614,860
[45] Date of Patent: Sep. 30, 1986

[54] PROCESS AND DEVICE FOR THE ANTICIPATORY SELF-ADAPTING REGULATION OF A PROCEDURE

[75] Inventor: Michel Kativois, Biviers, France

[73] Assignee: Societe Kativois, France

[21] Appl. No.: 716,419

[22] Filed: Mar. 27, 1985

[30] Foreign Application Priority Data

Mar. 30, 1984 [FR] France ............................. 84 05339

[51] Int. Cl.⁴ ............................................. H05B 1/02
[52] U.S. Cl. ..................................... 219/492; 219/501;
 219/497; 340/589
[58] Field of Search ............... 219/497, 499, 501, 508,
 219/494, 492; 340/588, 589

[56] References Cited

U.S. PATENT DOCUMENTS 4,523,084 6/1985 Tamura et al. ...................... 219/497
4,570,054 2/1986 Chidzey et al. ..................... 219/497

Primary Examiner—M. H. Paschall
Attorney, Agent, or Firm—William A. Drucker

[57] ABSTRACT

The device of the invention serves for the temperature regulation of an element heated by means of a heat source and whose temperature is measured by means of a detector. Said device includes a digital processor supplying a programmed reference digital signal. It further comprises a D/A converter transforming said digital signal into an analog reference signal, a subtractor which receives this reference signal and the one supplied by the detector, an A/D converter transforming the difference signal $\epsilon$ into a digital signal, processing structure for elaborating a correction signal as a function of an anticipated energy difference and a power control circuit for the energy source responsive to said correction signal.

12 Claims, 3 Drawing Figures

PROCESS AND DEVICE FOR THE ANTICIPATORY SELF-ADAPTING REGULATION OF A PROCEDURE

BACKGROUND OF THE INVENTION

1. Field of the Invention

The present invention relates to a process and a device for regulating a procedure and more particularly, but not exclusively, for the temperature regulation of an element such as an oven heated by means of a controllable power heat energy source and whose temperature may be measured by a detector such for example as a thermocouple.

2. Description of the Prior Art

Generally, numerous solutions have been proposed for providing such regulation. However, it has proved that most of these solutions, in particular conventional regulators of the proportional-integral type (P.I) or of the proportional-integral-drift type (P.I.D) have the disadvantage of being set for a single given temperature value, this setting being very approximate for other temperature values.

To get over this drawback, self adapting regulators have also been proposed which usually require the use of digital computers. control of the regulation is then provided by using a mathematical model of the element to be regulated which should be updated periodically by using as well as possible the measurements made on said element. It is clear that this approach is relatively complex and costly and poses numerous theoretical and practical problems.

SUMMARY OF THE INVENTION

The aim of the invention is then more particularly to overcome these disadvantages. For this it provides a self-adapting regulation process and device based on anticipatory operation which, by permanent self-adjustment on the element to be regulated, optimizes the qualities of the regulation and allows a rational use of the notion of regulation to be obtained whatever the desired operating point, without external intervention, without searching for a regulation constant (variable depending on the element to be regulated) and without setting or presetting.

To arrive at this result, in the case of thermal regulation, the invention is based on the fact that if an amount of energy Q is transmitted to an element to be heated, this energy is broken down into two fractions, namely:

1. The energy Q absorbed by the element, which is expressed as:

$$Q = R(\sigma - \sigma_o)$$

2. the power W for heating the element $$W = K \frac{d\sigma}{dt}$$

in which expressions R is the thermal resistance of the element, K is the thermal capacity of the element, $\sigma_o$ is the initial temperature of the element and $\sigma$ is the temperature at a time t of this element.

It is therefore possible to determine a power correction to be made for effecting the regulation from two terms related to these two phenomena, namely, a term $\alpha$ which is proportional to R and a term $\beta$ which is proportional to K. This power correction C may then be expressed in the form:

$$C = \alpha\sigma + \beta \frac{d\sigma}{dt}$$

The invention proposes obtaining self-adaptability of the regulation by determining a power correction of this type, by anticipation, i.e. by the estimative (or predictive) study of the behavior of the element to be regulated.

For this, it is based on the following fundamental principle: considering the temperature curve imposed by the program chosen (in particular the instantaneous temperature rise slope of the curve defined by the program) it is possible to forecast, from a temperature $\sigma_o$ at a time $t_o$, what the anticipated temperature $\sigma_a$ might be at the end of a time $t_a$, if the system continued to behave as at time $t_o$. It is then possible to determine an anticipated difference $E_a$ (between the reference imposed by the program and the anticipated temperature) from which a new theoretical expression of the power correction to be made may be inferred:

$$C_o = \alpha\sigma_a + \beta \frac{d\sigma_a}{dt}$$

in which expression the term $$\frac{d\sigma_a}{dt}$$

is the slope of the anticipated reference:

$$\left( \frac{\sigma_a - \sigma_o}{t_a - t_o} \right)$$

To this theoretical expression of the power correction to be made is added a corrective term $C_1$ which is added to the term $C_o$, namely:

$$C_1 = \gamma E_a = \gamma(\sigma_{ca} - \sigma_a)$$

$\sigma_{ca}$ being equal to the temperature imposed by the program after the time $t_a$. In which expression $\gamma$ is a factor depending on the constants of the element to be regulated and is proportional to $\beta$. The term $\gamma$ is similar to a gain for it depends on the difference $E_a$.

The problem then arises of determining the anticipation time $t_a$ which must necessarily be adapted to the characteristics of the element to be regulated.

For this, the invention proposes a method of automatic determination of this anticipation time during the initialization phase of the regulator, in accordance with a sequence comprising the following steps:

sending to the element to be regulated a succession of power pulse trains, the pulses of the same train (for example three in number) being formed as identical square waves and having a period and energy greater, for example double those of the preceding pulse train;

detecting the temperature variations of the element to be regulated (response of the oven);

comparing the temperature variations detected with a value representative of a reference temperature difference;

determining a first anticipation time $t_a$ from the pulse train which caused a temperature difference greater than the reference difference;

determining a second anticipation time $t'_a$ equal to a fraction of the time $t_a$ (for example $t'_a = \frac{1}{2} t_a$);

calculating the slope of the anticipated reference from the values $t_a$ and $t'_a$.

It will be noted that, in order to improve some factors of the regulator, it has been necessary to determine other anticipation time elements related to the time $t_a$ thus defined by a multiplicator coefficient (for example a $\frac{1}{2}, \frac{1}{4}, \frac{1}{8}, \ldots$).

The above description shows the way in which the regulation is managed by the process of the invention, the way in which the anticipation time is determined and how this anticipation time is self-adjusted for each element to be regulated.

It remains then to define the method of self-adjustment of the coefficients $\alpha$ and $\beta$, the coefficient $\gamma$ which is related to $\beta$ by an empirically determined factor thus itself being self-adjusted from the determination of $\beta$.

Thus, according to another characteristic of the invention, the coefficients $\alpha$ and $\beta$ are permanently adjusted as a function of a cumulated anticipated difference I related to time $t_a$ and defined by the integral:

$$I = \int_t^{t_a} \Delta \sigma dt,$$

this adjustment comprising the following steps:

determination of the cumulated anticipated difference I, comparison of this value I with an empirically determined threshold value $I_o$, depending on whether I is greater or smaller than $I_o$, incrementation or decrementation either of the coefficient $\alpha$, or of the coefficient $\beta$, by a fraction of this coefficient, for example by 3%, this incrementation or this decrementation only taking place on the heaviest weight coefficient $\alpha$ or $\beta$ (i.e. solely on the preponderant term).

Preferably, the minimum time between two incrementations is made dependent on the anticipation time $t_a$ so as to avoid the disturbances related to the analog circuits and to the digital circuits (digital noises) used.

It should moreover be noted that the initial values $\alpha_o$ and $\beta_o$ of the coefficients $\alpha$ and $\beta$ are advantageously minimum values close to all the minimum values found experimentally taking into account the fact that experience shows that, in order to obtain more rapid convergence, it is preferable to reach the values $\alpha$ and $\beta$ through lower values.

The values of the coefficients $\alpha$ and $\beta$ may be advantageously limited by safety stops, so as to maintain these coefficients within a range $\alpha_{min} - \alpha_{max}$ and $\beta_{min} - \beta_{max}$.

In addition, for reasons of correct regulation, the invention may comprise means for inhibiting the self-adjustment and the self-adaptation when the power correction to be made $C_o$ is zero or else when it is maximum.

As mentioned above, the temperature variation law to which the element to be regulated is subjected is imposed by the program. Of course, this law of variation results in a corresponding temperature curve which may comprise a succession of rising, level and descending segments forming bends therebetween.

The process of the invention proposes then a solution for obtaining a correct response (without overshooting) at each bend, this solution consisting in determining, from the program, the moment which terminates a segment of the temperature curve which it is desired to obtain and in reducing the anticipation time on approaching the bend following said moment. This reduction of the anticipation time may be effected by dividing it by values, for example 2, 4, 8, which increase as said bend is approached, so that the measured temperature curve of the element to be regulated follows tangentially the temperature curve imposed by the program and so that a change of programming state is neither overcompensated nor undercompensated.

It will be remembered that in the above described process, the anticipation time is determined during the initialization phase by sending to the element to be regulated a succession of pulse trains whose pulses have values (energy and period) increasing from one train to another.

The invention further proposes a method for improving this determination of the anticipation time by taking into account the response times of the element to be regulated. This method consists in sending a power level to the element to be regulated, during an initial phase, for a given time $t_i$ (for example between 1 second and 12 minutes) and in measuring the temperature of the element.

If, following this power level, no significant temperature deviation of the element to be regulated is detected, a power level of a higher value (for example twice the power) is sent. This operation is repeated with an increased power every time until a significant temperature deviation is obtained. Of course, beyond a certain number of times, the absence of response from the element to be regulated means that an anomaly has occurred.

When a significant temperature deviation is detected, the energy level of the power level which produced this deviation is taken and this energy level is used for determining the amplitude of the square waves of the pulse trains for determining the anticipation time $t_a$ in the way described above.

It will be noted that the initial value of the coefficients $\alpha$ and $\beta$ is determined arbitrarily. These coefficients are optimized during the first temperature rise of the element to be regulated and during the first plateau. They are then readjusted continually.

Of course, the invention also provides a device for implementing the above defined process.

BRIEF DESCRIPTION OF THE DRAWINGS

One embodiment of such a regulation device will be described hereafter by way of non limitative example, with reference to the accompanying drawings in which.

DESCRIPTION OF THE PREFERRED EMBODIMENT

Figure 1:
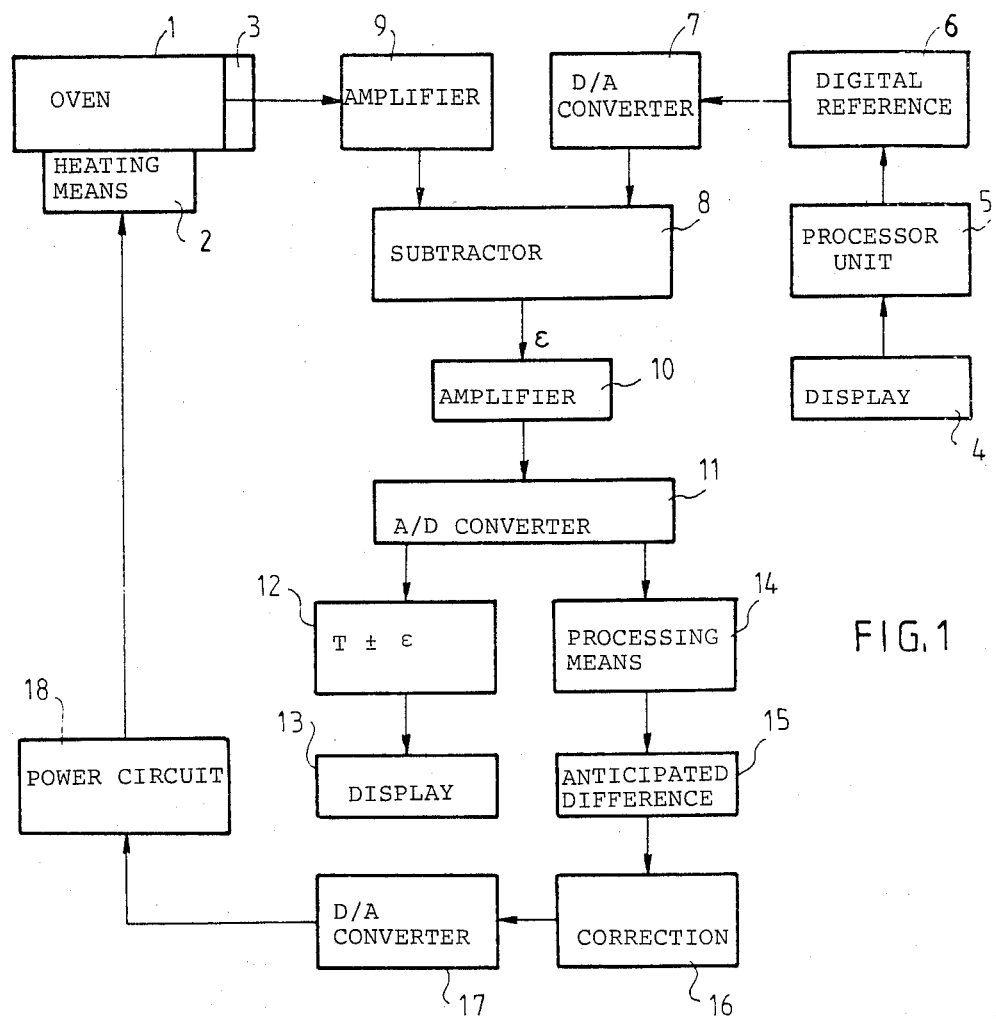
FIG. 1 is a block diagram of the regulation circuit for an oven.

In the example shown in FIG. 1, the regulation applies to an oven 1 equipped with controllable power heating means 2 as well as a device 3 for measuring the temperature inside the oven 1.

This device may use a digital processor in which is introduced a program defining the law of variation of the temperature which it is desired to obtain inside the oven.

This processor comprises more especially means (block 4) for displaying the temperature variation curve as a function of time which it is desired to obtain inside oven 1 as well as means (block 5) for carrying out this program by supplying, in real time, a digital reference signal (block 6) transformed into an analog reference signal by a digital-analog converter 7.

This analog reference signal is transmitted to a subtractor 8 which receives, at its other input, the signal representative of the temperature supplied by the measuring device 3 and suitably amplified (amplifier 9). The difference signal $\epsilon$ supplied by this subtractor 8 is amplified (amplifier 10) then transferred to an analog-digital converter which supplies a digital signal usable by the processor. This latter comprises means (block 12) for reconstituting the temperature of the oven (reference temperature $\pm$ the difference $\epsilon$) for displaying it (block 13). It also comprises means for digitally processing the difference 14 for determining the anticipated difference (block 15) and for working out the correction to be made (block 16). The digital signal representative of the correction to be made is then transmitted to a digital-analog converter 17 whose output signal controls the power of the oven heating means, through a power circuit 18.

Figure 2:
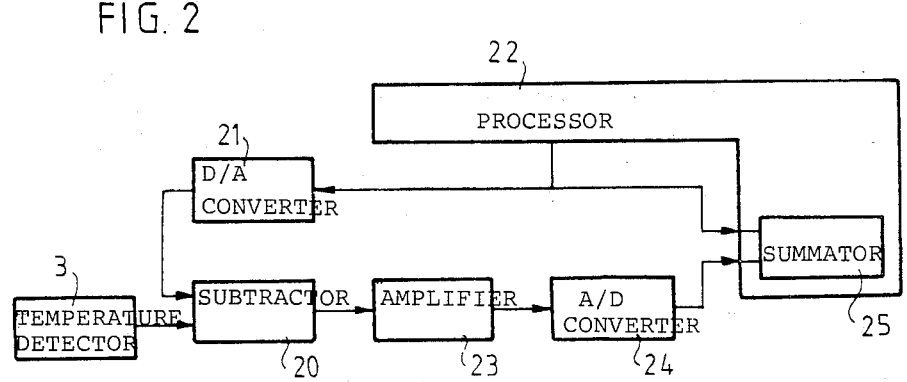
FIG. 2 is a diagram of a circuit for digitilizing the detected temperature of the oven.

It should be noted that with a view to reducing the cost of the circuit for reading the temperature of the oven, and, in particular, for reducing the dimension of the analog converter used, this circuit may advantageously be constructed such as shown in FIG. 2.

In this circuit, the analog signal delivered by the temperature measuring device 3 equipping oven 1 is applied to an analog subtractor 20 which receives at its other input an analog reference signal obtained by digital-analog conversion (block 21) of the digital reference signal elaborated by a processor 22 from the program. The analog error signal supplied by this subtractor is transmitted, after amplification (block 23), to an analog-digital converter 24 which delivers consequently a digital signal representative of the difference signal.

This digital signal is then added (block 25) in processor 22 to the digital reference signal, so that at the output of the adder a digital signal is obtained representative of the measured temperature of oven 1.

This circuit has the advantage of being able to use a 12 bit analog-digital converter 23 instead of a 16 bit converter which would be required if it were desired to convert directly the signal supplied by the temperature measuring device with great accuracy.

Figure 3:
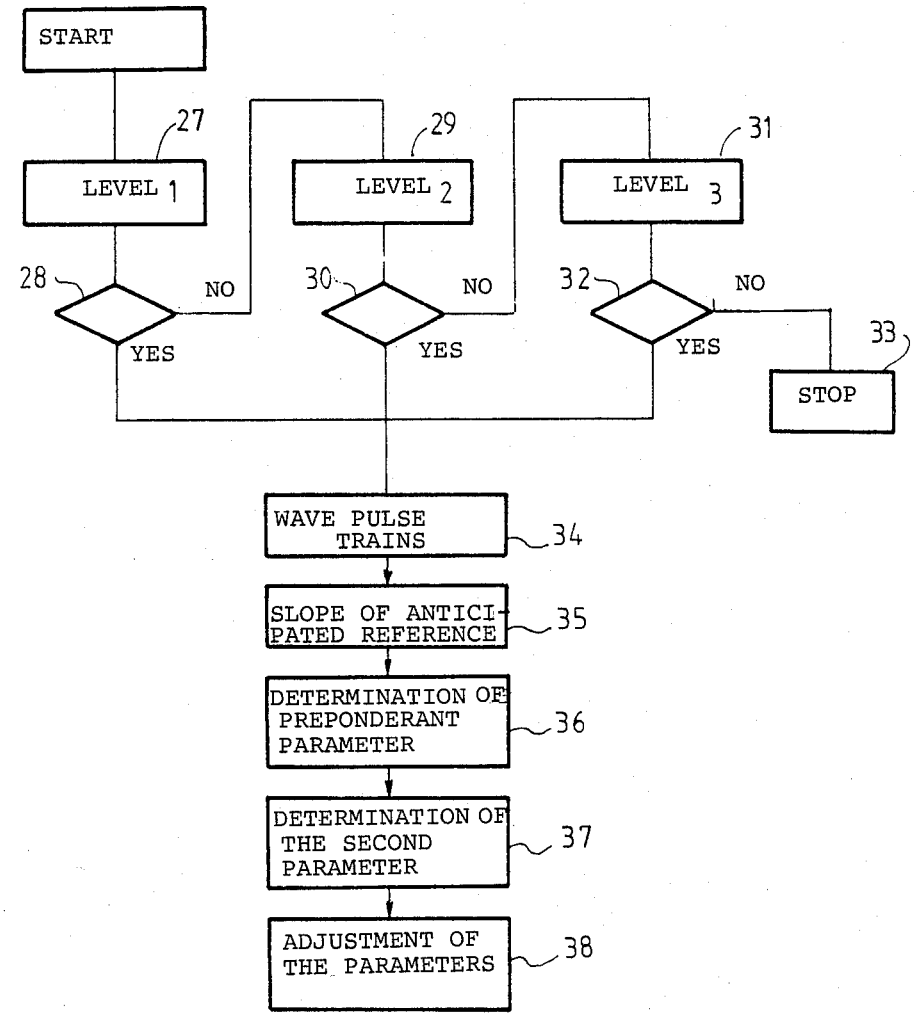
FIG. 3 is a simplified flow chart illustrating the principle for setting up regulation of a new oven, with self-determination and self-adjustment of the parameters used for the regulation.

The flow chart shown in FIG. 3 illustrates the sequencing of the operations carried out by the processor when setting up regulation of a new oven.

In this flow chart, the processor controls first of all the execution of a first power stage (block 27) at a first power level (level 1). In the case where, following this plateau, within a given time (for example 3 minutes), the processor detects no significant variation of the temperature of oven 1, it effects (conditional connection 28) a new cycle by emitting a second power stage (block 29) higher than the first one. Similarly, if after this second plateau, the processor detects no significant variation in the temperature of the oven, it starts (conditional connection 30) a new cycle with a power stage (block 31) of an even higher level (level 3). The absence of response from the oven following this third cycle causes (conditional connection 32) stopping of the regulation device (block 33) and, possibly, the emission of an alarm signal.

In the case where the processor detects a significant temperature variation following the emission of one of these power stages, it proceeds to executing (block 34) square wave pulse trains for determining the anticipation time $t_a$. It will be remembered that this anticipation time is determined from the pulse train which caused a temperature difference greater than the reference difference. The processor then determines a second reference time $t'_a = \frac{1}{2} t_a$, then the slope of the anticipated reference (block 35).

Once the operations have been carried out, the processor initiates heating of the oven in accordance with the reference applied by the program.

During the first temperature rise, it determines between the two parameters ($\alpha$ or $\beta$) used for effecting the power connections, the one which is preponderant (block 36), then during the first plateau it determines the second parameter (block 37). It then continues with the regulation by continually adjusting the parameters $\alpha$ and $\beta$ (block 38).

The above described device has numerous advantages. It allows high stability of the regulation to be obtained while ensuring high performances and good reliability. Its programming is simple and offers very great flexibility in use and a multiplicity of control means among which will be simply mentioned:

display of the segment on which is situated the operating point of the oven at a given time as well as the indication of the voltage, of the time, with the possibility of examining past and future segments, indication of the state of programming and the state of execution, direct reading of the regulated temperature, reading by examining the reference temperature, the possibility of multiplexing several regulators.

What is claimed is:

1. A process for the temperature regulation of an element heated by means of an electrically controllable heating source, said process comprising the following steps of:

detecting the temperature $\sigma$ of said element;

comparing the detected temperature with a reference value established by a program which defines the law of variation of the desired temperature;

obtaining an error signal which is a function of the difference between the detected temperature and said reference value;

determining a plurality of anticipated time periods which correspond respectively to successive effective time periods;

determining for each of said anticipated time periods, an anticipated temperature $\sigma_a$ at the end of this anticipated time period, said anticipated temperature $\sigma_a$ being representative of the temperature of the element at the end of this anticipated time period, if the error signal was applied to said controllable heating source without correction;

determining an anticipated reference slope $$\frac{d\sigma_a}{dt}$$

obtaining for each of said anticipated time periods a power correction signal to be applied on said difference signal, said power correction signal being obtained by computing a formula of the type $$C_o = \alpha \sigma_a + \beta \frac{d\sigma_a}{dt}$$

in which expression $\alpha$ is a coefficient proportional to the resistance of the element and $\beta$ is a coefficient proportional to the thermal capacity of the element;

applying during each of said effective time periods, on said error signal the power correction signal computed for the anticipated time period which corresponds to said effective time period;

applying said control signal to said controllable heating source.

2. The process as claimed in claim 1, wherein said anticipation time is determined during an initialization phase comprising the following steps:

supplying to the element to be regulated a succession of power pulse trains, the pulses of the same train being identical and having a period and an energy greater than those of the preceding pulse trains;

detecting the temperature variations of the element to be regulated;

comparing the variations detected with a value representative of a reference temperature difference and determining the anticipation time period from the pulse train which caused a temperature difference greater than the reference difference.

3. The process as claimed in claim 2, wherein the amplitude of the pulses of said pulse trains for determining said anticipation time period $t_a$ is obtained by the following sequence:

application during an initial phase to the element to be regulated of a power stage for a given time $t_i$, detecting a temperature difference of the element, in the case where no significant temperature difference is observed, the application of a new power stage of a higher value, repetition of the application of a new power stage of a higher value as long as a significant temperature difference is not detected, when a significant temperature difference is detected, the use of the energy level of the power stage which produced said significant difference for determining the amplitude of said pulses.

4. The process as claimd in claim 1, wherein determination of the slope of the anticipated reference comprises the determination of a second anticipation period $t'_a$ equal to a fraction of the period $t_a$ and calculation of the slope of the anticipated reference from the values $t_a$, $t'_a$, $\sigma_a$ and $\sigma'_a$, $\sigma'_a$ being the temperature of the element at the end of the period $t'_a$.

5. The process as claimed in claim 1, characterized in that said coefficients $\alpha$ and $\beta$ are permanently adjusted, in accordance with the following sequence of operations:

determination of a cumulated anticipated difference I defined by the integral:

$$I = \int_{t}^{t_a} \Delta \sigma dt$$

comparison of this cumulated anticipated difference I with an experimentally determined threshold value $I_o$, and depending on whether I is greater or smaller than $I_o$, incrementation either of coefficient $\alpha$ or of coefficient $\beta$ by a fraction of this coefficient, this incrementation or this decrementation only taking place on the heaviest weight coefficient $\alpha$ or $\beta$.

6. The process as claimed in claim 5, wherein the minimum time between two incrementations depends on the anticipation time period $t_a$.

7. The process as claimed in claim 1, wherein on approaching the bend present in the temperature variation curve imposed by the program, the anticipation time period $t_a$ is reduced.

8. The process as claimed in claim 7, wherein said reduction of the anticipation time period $t_a$ is obtained by dividing it by values which increase as said bend is approached.

9. The process as claimed in claim 1, wherein the initial values $\alpha_o$ and $\beta_o$ of coefficients $\alpha$ and $\beta$ are minimum values, so as to reach the values $\alpha$ and $\beta$ through lower values.

10. A device for temperature regulation of an element heated by means of an electrically controllable heating source and whose temperature is measured by means of a detector, said device including a processor in which is introduced a program defining the law of variation of the temperature of the element which it is desired to obtain and supplying in real time, a digital reference signal, said device further comprising:

a digital-analog converter transforming the reference digital signal into a reference analog signal, a subtractor which receives the reference analog signal and a signal coming from said detector and which delivers a difference signal, means for processing said difference signal so as to provide a control signal for said heating source, and a circuit for controlling the power of the heating source responsive to said control signal, said means for processing said difference signal comprising:

means for determining a plurality of successive anticipated time periods which correspond respectively to successive effective time periods;

means for determining for each of said anticipated time periods an anticipated temperature $\sigma_a$ at the end of this anticipated time period, said anticipated temperature $\sigma_a$ representative of the temperature of the element at the end of this anticipated time period, if the difference signal was applied to said controllable heating source without correction means for determining an anticipated reference slope $$\frac{d\sigma_a}{dt};$$

computing means adapted to obtain for each of said anticipated time periods a power correction signal to be applied on said difference signal, according to a formula of the type $$C_o = \alpha \sigma_a + \beta \frac{d\sigma_a}{dt}$$

in which expression $\alpha$ is a coefficient proportional to the resistance of the element and $\beta$ is a coefficient proportional to the thermal capacity of the element;

means for applying during each of said effective time periods said power correction signal on said difference signal in order to obtain said control signal.

11. The device as claimed in claim 10, further comprising a circuit for reading the temperature of said element, this circuit comprising:

an analog subtractor receiving the signal delivered by the signal from said detector and an analog reference signal obtained by digital-analog conversion of the digital reference signal elaborated by the processor, an analog-digital converter transforming the difference signal supplied by the subtractor into a corresponding digital difference signal, and a digital adder working out the sum of the digital reference signal supplied by the processor and said digital difference signal.

12. A process for the temperature regulation of an element heated by means of an electrically controllable heating source, said process comprising the following steps of detecting the temperature $\sigma$ of said element;

comparing the detected temperature with a reference value established by a program which defines the law of variation of the desired temperature;

obtaining an error signal which is a function of the difference between the detected temperature and said reference value;

determining a plurality of anticipated time periods which correspond respectively to successive effective time periods;

determining for each of said anticipated time periods, an anticipated temperature $\sigma_a$ at the end of this anticipated time period, said anticipated temperature $\sigma_a$ being representative of the temperature of the element at the end of this anticipated time period, if the error signal was applied to said controllable heating source without correction;

determining an anticipated reference slope $$\frac{d\sigma_a}{dt};$$

obtaining for each of said anticipated time periods $t_a$ a first power correction signal obtained by computing a formula of the type $$C_o = \alpha\sigma_a + \beta\frac{d\sigma_a}{dt}$$

in which expression $\alpha$ is a coefficient proportional to the resistance of the element and $\beta$ is a coefficient proportional to the thermal capacity of the element;

determining a difference $E_a$ between the reference temperature $\sigma_{ca}$ imposed by the program at the end of the anticipated time period $t_a$ and the anticipated temperature $\sigma_a$ at the end of the anticipation time period $t_a$;

determining a corrective signal $C_1$ of the form $$C_1 = \gamma E_a$$

$\gamma$ being a factor proportional to the thermal capacity of the element;

elaborating of a second power correction signal which is representative of the sum of said first power correction signal and of the said corrective signal;

applying during each of said effective time periods on said error signal the second power correction signal elaborated for the anticipated time period which corresponds to said effective time period;

applying said control signal to said controllable heating source.

* * * * *